US012591226B2

(12) United States Patent
Chow et al.

(10) Patent No.: US 12,591,226 B2
(45) Date of Patent: Mar. 31, 2026

(54) CLOUD-BASED VIBRATORY FEEDER CONTROLLER

(71) Applicant: ATS Automation Tooling Systems Inc., Cambridge (CA)

(72) Inventors: Michael Tze-Chun Chow, Cambridge (CA); Stanley Kleinikkink, Cambridge (CA)

(73) Assignee: ATS CORPORATION (CA)

( * ) Notice: Subject to any disclaimer, the term of this patent is extended or adjusted under 35 U.S.C. 154(b) by 350 days.

(21) Appl. No.: 17/708,244

(22) Filed: Mar. 30, 2022

(65) Prior Publication Data

US 2022/0334566 A1    Oct. 20, 2022

Related U.S. Application Data

(60) Provisional application No. 63/168,843, filed on Mar. 31, 2021.

(51) Int. Cl.
*G05B 19/418* (2006.01)
*B65G 43/00* (2006.01)

(52) U.S. Cl.
CPC ....... *G05B 19/41875* (2013.01); *B65G 43/00* (2013.01); *G05B 2219/32368* (2013.01); *G05B 2219/50386* (2013.01)

(58) Field of Classification Search
CPC .............. G05B 23/024; G05B 23/0272; G05B 23/0283; G05B 23/0275; G05B 23/0232;
(Continued)

(56) References Cited

U.S. PATENT DOCUMENTS 2,276,383 A * 3/1942 Francis .................. G01G 11/12
241/34
4,216,416 A * 8/1980 Grace .................... B65G 27/32
318/128
(Continued)

FOREIGN PATENT DOCUMENTS

CN     108646691 A  * 10/2018
DE        2239501 A1     2/1974
(Continued)

OTHER PUBLICATIONS

Mustakerov Ivan et al: "An intelligent approach to optimalkoptedidine maintenance strategy defining", Proceedings of the 2013 International Conference on Innovations in Intelligent Systems and Applications (INISTA), IEEE, Jun. 19, 2013, pp. 1-5, XP032474561, DOI: 10.1109/IN ISTA.2013.6577666, ISBN:978-1-4799-0659-8.
(Continued)

*Primary Examiner* — Darrin D Dunn

(57)    ABSTRACT
Systems and methods of monitoring a production level of a vibratory feeder configured to process a workpiece are described herein. The methods include operating a processor to: receive device data associated with the vibratory feeder during operation of the vibratory feeder, the device data comprising at least one input state of the vibratory feeder; receive production data associated with the vibratory feeder, the production data being representative of a production level of the vibratory feeder; determine, based on the device data and/or the production data, one or more faults corresponding to the vibratory feeder when the production level falls below a threshold production level; and determine, based on the one or more faults, a corrective action to return the production level to or above the threshold production level.

7 Claims, 3 Drawing Sheets

(58) Field of Classification Search
CPC .......................... G05B 23/027; G05B 19/058;
G05B 2223/02; G05B 2219/37434; B02C
23/02; B02C 23/08

See application file for complete search history.

(56) References Cited

U.S. PATENT DOCUMENTS

| | | | | |
|---|---|---|---|---|
| 4,776,242 | A * | 10/1988 | Poux .................... | B23P 19/004 |
| | | | | 81/57.37 |
| 5,074,435 | A * | 12/1991 | Suverkrop ............. | G01G 11/08 |
| | | | | 241/34 |
| 5,090,113 | A * | 2/1992 | Umetsu ................ | B23P 19/001 |
| | | | | 29/709 |
| 5,473,703 | A * | 12/1995 | Smith .................... | G06M 11/00 |
| | | | | 221/200 |
| 5,756,939 | A * | 5/1998 | Taniguchi ........... | G01G 19/393 |
| | | | | 177/121 |
| 5,772,128 | A * | 6/1998 | McRae .................. | B06B 1/183 |
| | | | | 241/36 |
| 7,283,914 | B2 * | 10/2007 | Poorman ........... | G05B 23/0267 |
| | | | | 702/56 |
| 8,301,406 | B2 * | 10/2012 | Lee .................... | G06F 18/2137 |
| | | | | 702/77 |
| 8,352,216 | B2 * | 1/2013 | Subbu .................... | G06F 11/30 |
| | | | | 700/109 |
| 9,244,042 | B2 * | 1/2016 | Rank .................. | G01N 29/4454 |
| 10,162,693 | B1 * | 12/2018 | Contino ............. | G06F 11/0742 |
| 10,191,796 | B1 * | 1/2019 | Havemose ........... | G06F 11/076 |
| 10,354,332 | B2 * | 7/2019 | Trainor ............ | G08B 29/185 |
| 10,699,556 | B1 * | 6/2020 | Ganapathi ............. | G08B 29/16 |
| 11,092,951 | B2 * | 8/2021 | Rikkola ............. | G05B 23/0232 |
| 11,610,076 | B2 * | 3/2023 | Iskandar ............ | G06F 11/3075 |
| 11,816,590 | B2 * | 11/2023 | Alam ........................ | G06N 7/01 |
| 11,953,894 | B2 * | 4/2024 | Schuster ................ | G06N 20/00 |
| 2002/0128810 | A1 * | 9/2002 | Craig .................... | G05B 17/02 |
| | | | | 703/17 |
| 2007/0209910 | A1 * | 9/2007 | Lewis .................. | B23P 19/003 |
| | | | | 198/757 |
| 2008/0059080 | A1 * | 3/2008 | Greiner .................. | H04L 43/16 |
| | | | | 702/182 |
| 2009/0096405 | A1 * | 4/2009 | Flickinger ............ | G01R 31/343 |
| | | | | 702/183 |
| 2010/0023307 | A1 * | 1/2010 | Lee .................... | G06F 18/2321 |
| | | | | 703/7 |

| | | | | |
|---|---|---|---|---|
| 2010/0082125 | A1 * | 4/2010 | Pingel ................ | G05B 23/0272 |
| | | | | 700/47 |
| 2012/0076352 | A1 * | 3/2012 | Quinn ...................... | B43M 3/04 |
| | | | | 382/101 |
| 2015/0149134 | A1 * | 5/2015 | Mehta ................ | G05B 23/0245 |
| | | | | 703/6 |
| 2015/0199224 | A1 * | 7/2015 | Mihnev ............... | G06F 11/0751 |
| | | | | 714/37 |
| 2015/0222495 | A1 * | 8/2015 | Mehta ............... | G05B 23/0272 |
| | | | | 715/736 |
| 2019/0021956 | A1 * | 1/2019 | Geltser ................. | A61J 7/0076 |
| 2019/0286116 | A1 | 9/2019 | Rothfuss | |
| 2019/0346837 | A1 * | 11/2019 | Dagnino ........... | G05B 23/0232 |
| 2020/0036745 | A1 * | 1/2020 | Yamada .................. | G06F 21/55 |
| 2020/0166921 | A1 * | 5/2020 | Lavid Ben Lulu ......................... | |
| | | | | G05B 23/0294 |
| 2020/0265331 | A1 * | 8/2020 | Tashman .................. | G06N 7/01 |
| 2020/0356898 | A1 * | 11/2020 | Claussen ........... | H04M 1/72403 |
| 2020/0393810 | A1 * | 12/2020 | Kempf .............. | G05B 23/0267 |
| 2021/0158207 | A1 * | 5/2021 | Alsahlawi ................ | G06N 5/04 |
| 2021/0262689 | A1 * | 8/2021 | Shinde .................... | F24F 11/38 |
| 2021/0310901 | A1 * | 10/2021 | Decook ................. | G01F 23/296 |
| 2022/0121345 | A1 * | 4/2022 | Shi .................. | G06F 40/205 |
| 2022/0244682 | A1 * | 8/2022 | Walczyk ............... | G06F 17/142 |
| 2022/0283576 | A1 * | 9/2022 | Cheng ............... | G05B 23/0254 |
| 2023/0126822 | A1 * | 4/2023 | Lin .................... | G05B 23/0281 |
| | | | | 702/183 |
| 2023/0152792 | A1 * | 5/2023 | Mears ............... | G05B 23/0224 |
| | | | | 700/109 |
| 2023/0366773 | A1 * | 11/2023 | Teyhan .............. | G05B 23/0243 |
| 2023/0384763 | A1 * | 11/2023 | Hickox ................ | G06K 7/1417 |
| 2023/0393011 | A1 * | 12/2023 | Ward ...................... | B07B 13/18 |
| 2024/0082975 | A1 * | 3/2024 | Kleinikkink ........... | G06T 7/0004 |
| 2024/0085878 | A1 * | 3/2024 | Schneider ........ | G06Q 10/06395 |
| 2024/0117139 | A1 * | 4/2024 | Garate .......... | C12Y 301/01074 |

FOREIGN PATENT DOCUMENTS

| | | | | |
|---|---|---|---|---|
| WO | WO-2019054983 | A1 * | 3/2019 | ............ B65G 27/08 |
| WO | 2020036851 | A1 | 2/2020 | |
| WO | 2020198256 | A1 | 10/2020 | |

OTHER PUBLICATIONS

Extended European Search Report, European Patent Office (Munich, Germany), Oct. 7, 2022.

* cited by examiner

300

302
Receive device data associated with a vibratory feeder

304
Receive production date associated with the vibratory feeder

306
Determine one or more faults corresponding ot the vibratory feeder

308
Determine a corrective action

CLOUD-BASED VIBRATORY FEEDER CONTROLLER

CROSS-REFERENCE

The present application claims the benefit of U.S. Provisional Patent Application No. 63/168,843 entitled "Cloud-based Vibratory Feeder Controller" filed on Mar. 31, 2021, the contents of which are hereby incorporated by reference in their entirety.

FIELD

This disclosure relates generally to vibratory feeders and, in particular to cloud-based systems and methods of monitoring vibratory feeders.

BACKGROUND

Vibratory bowl feeders are common devices that are used to feed individual component parts for assembly on industrial production lines. Vibratory bowl feeders are typically used when a randomly sorted bulk package of small components are desired to be fed into another machine one-by-one and oriented in a particular direction.

Vibratory feeders rely on the mechanical behaviour of a part, such that when gently shaken down a conveyor chute that is shaped to fit the part, they will gradually be shaken so that they are all aligned. They thus leave the feeder's conveyor one-by-one, all in the same orientation. This conveyor then leads directly to the following assembly or packing machine.

In vibratory bowl feeders, small parts are desired to be sorted into a single file and in a particular direction and blockages inhibiting the movement of the parts can lead to significant delays and down time.

Accordingly, there is a need for new systems and methods of monitoring and/or optimizing the operation of vibratory feeders such as but not limited to vibratory bowl feeders.

SUMMARY

In accordance with a broad aspect, a method of monitoring a production level of a vibratory feeder configured to process a workpiece is described herein. The method includes operating a processor to: receive device data associated with the vibratory feeder during operation of the vibratory feeder, the device data comprising at least one input state of the vibratory feeder; receive production data associated with the vibratory feeder, the production data being representative of a production level of the vibratory feeder; determine, based on the device data and/or the production data, one or more faults corresponding to the vibratory feeder when the production level falls below a threshold production level; and determine, based on at least one of the device data, the production data and the one or more faults, a corrective action to return the production level to or above the threshold production level.

In at least one embodiment, the input state indicates that the vibratory feeder is overfed, underfed or starved.

In at least one embodiment, the device data includes one or more of: vibration sensor data; temperature sensing data; humidity sensing data; bowl fill level data; start/stop control data; override control data; part feed sensor(s) data; and live video data.

In at least one embodiment, the production data includes one or more of: parameter settings, monitoring variables and run rates.

In at least one embodiment, determining the one or more faults corresponding to the vibratory feeder is based on a prediction made by a predictive model.

In at least one embodiment, determining the corrective action includes comparing the device data to one or more of: historical feeder performance data; historical feeder settings controls, historical video feeds of the vibratory feeder; machine learning training; historical insights and alerts and parameter history.

In at least one embodiment, the corrective action is one of: adjusting a power and/or a frequency of a vibratory drive of the vibratory feeder; activating a bowl blow-off control; activating a hopper start/start control; issuing a replenish parts warning; and indicating a part jam fault.

In accordance with another broad aspect, a system for monitoring a production level of a vibratory feeder configured to process a workpiece is described herein. The system includes a processor configured to: receive device data associated with the vibratory feeder during operation of the vibratory feeder, the device data comprising at least one input state of the vibratory feeder; receive production data associated with the vibratory feeder, the production data being representative of a production level of the vibratory feeder; determine, based on the device data and/or the production data, one or more faults corresponding to the vibratory feeder when the production level falls below a threshold production level; and determine, based on at least one of the device data, the production data and the one or more faults, a corrective action to return the production level to or above the threshold production level.

In at least one embodiment, the input state indicates that the vibratory feeder is overfed, underfed, or starved.

In at least one embodiment, the device data includes one or more of: vibration sensor data; temperature sensing data; humidity sensing data; bowl fill level data; start/stop control data; override control data; part feed sensor(s) data; and live video data.

In at least one embodiment, the production data includes one or more of: parameter settings, monitoring variables and run rates.

In at least one embodiment, determining the one or more faults corresponding to the vibratory feeder is based on a prediction made by a predictive model.

In at least one embodiment, determining the corrective action includes comparing the device data to one or more of: historical feeder performance data; historical feeder settings controls, historical video feeds of the vibratory feeder; machine learning training; historical insights and alerts and parameter history.

In at least one embodiment, the corrective action is one of: adjusting a power and/or a frequency of a vibratory drive of the vibratory feeder; activating a bowl blow-off control; activating a hopper start/start control; issuing a replenish parts warning; and indicating a part jam fault.

In accordance with another broad aspect, a method for optimizing a production level of a vibratory feeder configured to process a workpiece is described herein. The method includes operating a processor to: receive device data associated with the vibratory feeder during operation of the vibratory feeder, the device data comprising at least one input state of the vibratory feeder; receive production data associated with the vibratory feeder, the production data being representative of a production level of the vibratory feeder; determine, based on the device data and/or the production data, one or more faults corresponding to the vibratory feeder when the production level falls below a threshold production level; and determine, based on at least one of the device data, the production data and the one or more faults, a corrective action to return the production level to or above the threshold production level.

In accordance with another broad aspect, a system for optimizing a production level of a vibratory feeder configured to process a workpiece is described herein. The system includes a processor configured to: receive device data associated with the vibratory feeder during operation of the vibratory feeder, the device data comprising at least one input state of the vibratory feeder; receive production data associated with the vibratory feeder, the production data being representative of a production level of the vibratory feeder; determine, based on the device data and/or the production data, one or more faults corresponding to the vibratory feeder when the production level falls below a threshold production level; and determine, based on at least one of the device data, the production data and the one or more faults, a corrective action to return the production level to or above the threshold production level.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
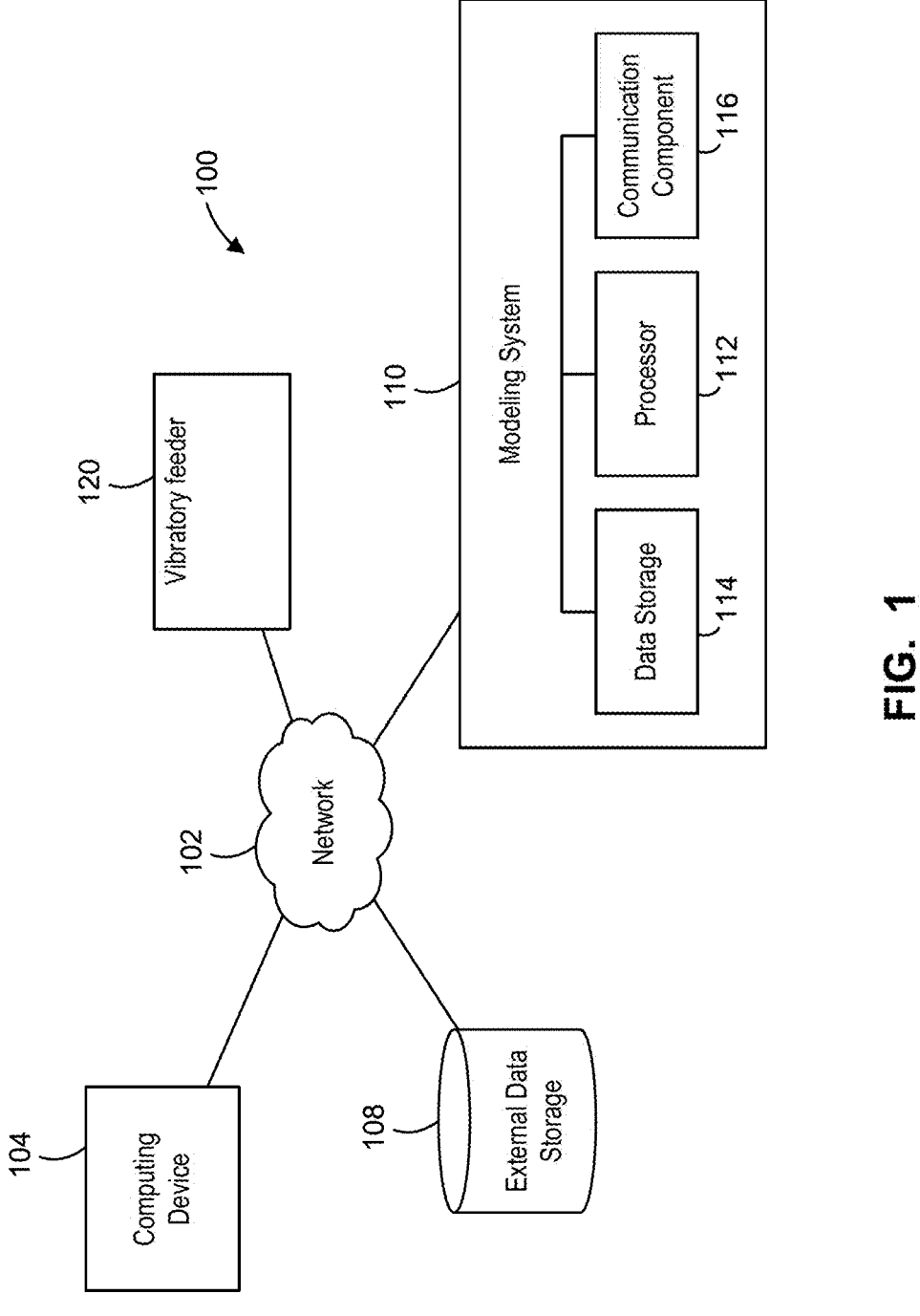
FIG. 1 is a block diagram of an example modeling system in communication with a vibratory feeder, in accordance with at least one embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Modern manufacturing assembly lines can involve many highly configurable machines that can produce complex final products. For example, manufacturing assembly lines configured to produce complex products such as medical devices, electronics, or automobiles, may involve more than hundreds, if not thousands, of processing steps.

One such machine used in complex manufacturing processes is a vibratory feeder, also commonly referred to as a vibratory bowl feeder. Vibratory feeders rely on the mechanical behavior of a part, such that when gently shaken down a conveyor chute that is shaped to fit the part, they will gradually be shaken so that they are all aligned. They thus leave the feeder's conveyor one-by-one, all in the same orientation. This conveyor then leads directly to the following assembly or packing machine.

It may be difficult to predict the behavior of a vibratory feeder. Despite a simplified arrangement, vibratory feeders typically exhibit highly complex, interdependent, and convoluted properties. Traditionally, understanding the behavior of a vibratory feeder typically involves relying on the intuition or "gut-feel" of expert operators who have significant experience dealing with a particular vibratory feeder. However, this may be unreliable when changes to the vibratory feeder are implemented. Furthermore, no such expert operators may be available when implementing a new product (or workpiece) to the vibratory feeder.

The systems and methods described herein can involve modeling the behavior of a vibratory feeder. For example, some embodiments described herein may involve predicting the production level of a vibratory feeder.

The systems and methods described herein may use artificial intelligence or machine learning methods to train (i.e., generate or build) models for predicting one or more properties of a vibratory feeder. For example, some embodiments described herein may involve receiving various data associated with a vibratory feeder, identifying data relevant to the operation of the vibratory feeder, and training a model using the relevant data. The systems and methods described herein may generate models that do not rely on explicit instructions or programming. Instead, the described systems and methods may generate models that utilize patterns or inferences determined from training data.

The systems and methods described can also involve using trained models for various purposes. For example, the trained models may be used to predict a production level of a vibratory feeder based on data associated with the vibratory feeder. In some embodiments, the trained models may be used to optimize the efficiency of a vibratory feeder. For example, the trained models may be used to determine the efficiency of various configurations to identify a target configuration. In some embodiments, the trained models may be used to evaluate faults in the vibratory feeder. For example, the trained models may be used to determine faults that should be prioritized to be addressed.

Referring now to FIG. 1, an example block diagram 100 of a modeling system 110 in communication with a vibratory feeder 120, an external data storage 108, and a computing device 104 via a network 102 is shown therein. Although only one vibratory feeder 120 and one computing device 104 are shown in FIG. 1, the modeling system 110 can be in communication with a greater number of vibratory feeders 120 and/or computing devices 104. For instance, the modeling system 110 can communicate with the vibratory feeder(s) 120 and computing device(s) 104 over a wide geographic area via the network 102.

The modeling system 110 includes a processor 112, a data storage 114, and a communication component 116. The modeling system 110 can be implemented with more than one computer server distributed over a wide geographic area and connected via the network 102. The processor 112, the data storage 114 and the communication component 116 may be combined into a fewer number of components or may be separated into further components.

The processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the modeling system 110. The processor 112 can include more than one processor with each processor being configured to perform different dedicated tasks.

The communication component 116 can include any interface that enables the modeling system 110 to communicate with various devices and other systems. For example, the communication component 116 can receive device data generated by the vibratory feeder(s) and store the device data in the data storage 114 or the external data storage 108. The processor 112 can then use the device data to train a predictive model according to the methods described herein.

The communication component 116 can include at least one of a serial port, a parallel port or a USB port, in some embodiments. The communication component 116 may also include an interface to component via one or more of an Internet, Local Area Network (LAN), Ethernet, Firewire, modem, fiber, or digital subscriber line connection. Various combinations of these elements may be incorporated within the communication component 116. For example, the communication component 116 may receive input from various input devices, such as a mouse, a keyboard, a touch screen, a thumbwheel, a track-pad, a track-ball, a card-reader, voice recognition software and the like depending on the requirements and implementation of the modeling system 110.

The data storage 114 can include RAM, ROM, one or more hard drives, one or more flash drives or some other suitable data storage elements such as disk drives. The data storage 114 can include one or more databases for storing data related to the vibratory feeder(s) 120, such as device data. The data storage 114 may also store various data related to models trained by the modeling system 110.

In some embodiments, the data storage 114 can be used to store an operating system and programs. For instance, the operating system provides various basic operational processes for the processor 112. The programs may include various user programs so that a user can interact with the processor 112 to perform various functions such as, but not limited to, viewing and/or manipulating the stored data, models, as well as retrieving and/or transmitting data.

The external data storage 108 can store data similar to that of the data storage 114. The external data storage 108 can, in some embodiments, be used to store data that is less frequently used and/or older data. In some embodiments, the external data storage 108 can be a third party data storage stored with cell, device, or line production data for analysis by the modeling system 110. The data stored in the external data storage 108 can be retrieved by the computing device 104 and/or the modeling system 110 via the network 102.

The computing device 104 can include any device capable of communicating with devices through a network such as the network 102. A network device can couple to the network 102 through a wired or wireless connection. The computing device 104 can include a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The network 102 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the modeling system 110, the vibratory feeder(s) 120, the external data storage 108, and the computing device 104.

Various types of data can be captured from the vibratory feeder(s) 120 and used by the modeling system 110. For example, data associated with vibratory feeder(s) 120 itself may be collected or sampled and/or data associated with production may be collected or sampled. The captured data may be stored in the vibratory feeder(s) 120, the computing device 104, the external data storage 108 and/or the data storage 114. The stored data may be formatted in various ways, such as, but not limited to, tensors, arrays, and the like. As will be described in greater detail with reference to FIG. 3, the captured data can be retrieved by the modeling system 110 and used to monitor the operation of the vibratory feeder, optimize the operation of the vibratory feeder or train a model or be used with a trained model to make predictions regarding the vibratory feeder 120.

The data captured from the vibratory feeder(s) 120 can include data related to the state of the vibratory feeder(s) 120 during operation, such as, whether a particular vibratory feeder(s) 120 is running normally, experiencing a fault, not running, starved, overfed, etc. For example, the device data may include data related to the speed, cycle time, temperature, humidity, etc. of the vibratory feeder(s) 120. The device data may also include data related to the device configuration for vibratory feeder(s) 120, defining various parameters of settings for the processing completed by the vibratory feeder(s) 120.

The data captured from the vibratory feeder(s) 120 can also include data associated with the productivity of the vibratory feeder(s) 120 during operation, which may be referred herein as production data. The production data may include data regarding the overall production level of the vibratory feeder(s) 120. For example, the production data can define the number of finished products produced by the vibratory feeder(s) 120 in a given period of time. The production data may also include data indicating the production level of a particular portion of the vibratory feeder(s) 120. The production data may also include data related to the defect level of the vibratory feeder(s) 120 (or a portion thereof). For example, the production data may define the number of defective products produced by the vibratory feeder(s) 120 in a given period of time.

The captured data may include datasets that are collected over a period of time. For example, the data may include timestamps corresponding to when a particular data point was sampled or measured. For example, the data may include production data that represents the production level of the vibratory feeder(s) 120 at various time points. Likewise, the data may also include device data that represents the state of one or more vibratory feeder(s) 120 at different times. The data may include different types of data that have the same timestamp (e.g., correspond to the same, or approximately the same, time). For example, the data may include a device state corresponding to a particular time, and a production level corresponding to the same time.

The data captured from the vibratory feeder(s) 120 may be generated by the vibratory feeder(s) 120 itself. For example, the vibratory feeder(s) 120 may include various sensors (not shown) configured to measure various properties of the vibratory feeder(s) 120. In some embodiments, the data may be generated by an external device, such as the computing device 104, configured to monitor the vibratory feeder(s) 120. In some cases, a human operator may inspect one or more portions of the vibratory feeder(s) 120, and electronically input the data into the computer device 104, the vibratory feeder(s) 120, or the modeling system 110.

Different types of data associated with the vibratory feeder(s) 120 may be captured at different sampling rates. For example, data associated with the device may be captured every 50 milliseconds. The data may be sampled in a manner such that different types of data can be temporally aligned. For example, some types of data may be sampled at a relatively higher rate than other types of data so that at least some of the oversampled data will correspond to the same (or approximately the same) time as data captured at a lower sampling rate. Oversampling data to temporally align the data may provide more accurate data points than merely interpolating data sampled at lower sampling rates or other similar methods.

Figure 2:
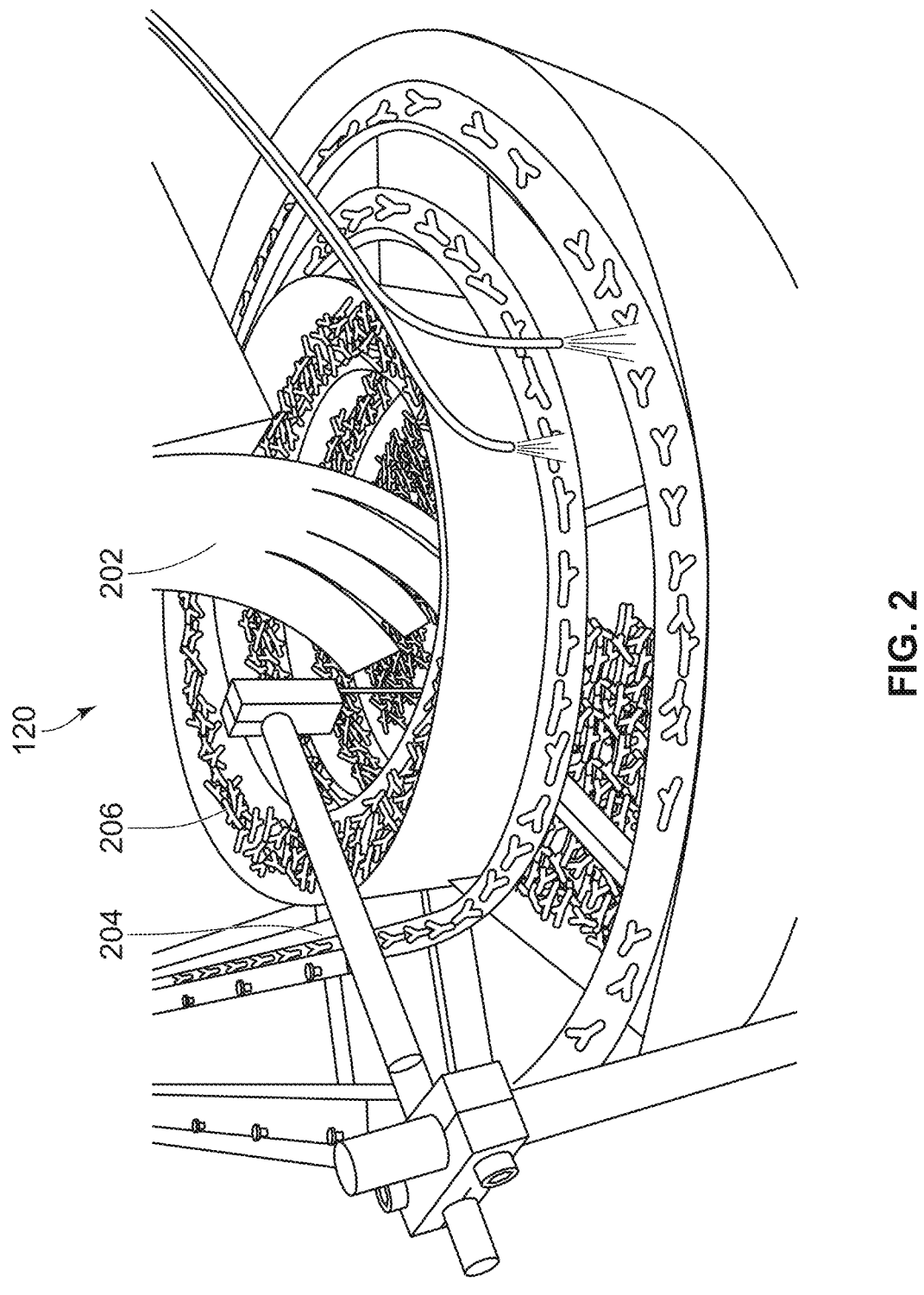
FIG. 2 is a perspective view of a vibratory feeder, according to at least one embodiment.

FIG. 2 shows an image of an example vibratory feeder 120 for sorting and/or aligning parts or products. The vibratory feeder 120 includes an inlet 202, an outlet 204 and a conveyor chute 206 extending therebetween that is shaped to fit the parts or products (i.e. workpieces). Conveyor chute 206 may have a single lane or may have more than one lane.

The vibratory feeder 120 also includes a vibrating drive unit (not shown), upon which the conveyor chute 206 is mounted, that is configured to vibrate the conveyor chute 206 such that the parts or products thereon will gradually be shaken so that each part or product (i.e. workpiece) is aligned in the conveyor chute 206 as the parts or products pass towards the outlet 204. The vibrating drive unit may be piezoelectric, electromagnetic or pneumatic and vibrates the conveyor chute 206, forcing the parts to move upwardly. The conveyor chute 206 is typically a circular, inclined track and the parts or products are typically vibrated to move upwardly along the conveyor chute 206. In some embodiments, the conveyor chute 206 may be inclined downwardly and the parts or products may be vibrated to travel downwardly along the conveyor chute 206.

The conveyor chute 206 has a shape that is designed to sort and orient the parts or products in to a consistent, repeatable manner. The conveyor chute 206 length, width, and depth may vary depending on the application and are typically carefully chosen to suit each application, component shape and size.

The vibratory feeder 120 also includes a variable-amplitude control box (not shown) that is configured to control the vibratory feeder 120. Specifically, the control box is used to control the vibration speed and or amplitude of the bowl feeder, and therefore control the flow of parts towards the outlet 204 via, for example, one or more sensors positioned along the conveyor chute 206.

In some vibratory feeder(s) 120, special bowl and track coatings may be applied to the conveyor chute 206 according to the shape size and material of the parts or products, which aids traction, inhibits damage to the product and/or lowers acoustic levels of the vibratory feeder(s) 120.

The parts or products thus leave the vibratory feeder 120 conveyor chute 206 one-by-one, all in the same orientation.

In most instance, the vibratory feeder 120 leads directly to a following assembly or packing machine.

In at least one embodiment, the vibratory feeder 120 includes one or more sensors to collect vibratory data (e.g. number of vibrations, amplitude, frequency, etc.) and provide the vibratory data to at least one of computing device 104 and modelling system 110.

For instance, in at least one embodiment, the vibrating drive unit is configured to collect the vibratory data and provide the vibratory data to at least one of computing device 104 and modelling system 110.

In at least one embodiment, the vibratory feeder 120 includes one or more sensors to collect temperature data (e.g. temperature of the air around the device, temperature of at least a portion of the chute 206, etc.) and provide the temperature data to at least one of computing device 104 and modelling system 110.

In at least one embodiment, the vibratory feeder 120 includes one or more sensors to collect humidity data (e.g. humidity of the air around at least a portion of the device) and provide the humidity data to at least one of computing device 104 and modelling system 110.

In at least one embodiment, the vibratory feeder 120 includes one or more sensors to collect bowl fill level data (e.g. data relating to a fill level of workpieces in the vibratory feeder 120, such as but not limited to a height or weight level of the workpieces in the vibratory feeder 120) and provide the bowl fill level data to at least one of computing device 104 and modelling system 110.

In at least one embodiment, the vibratory feeder 120 includes one or more sensors to collect start/stop control data (e.g. data relating to when the vibratory feeder 120 starts and stops) and provide the start/stop control data to at least one of computing device 104 and modelling system 110.

In at least one embodiment, the vibratory feeder 120 includes one or more sensors to collect override control data (e.g. data relating to when automatic control of the vibratory feeder 120 is overridden and the vibratory feeder is manually controlled) and provide the override control data to at least one of computing device 104 and modelling system 110.

In at least one embodiment, the vibratory feeder 120 includes one or more sensors to collect part feed data (e.g. data relating to how many parts are fed to the vibratory feeder 120, data relating to how many parts are ejected back into vibratory feeder 120 due to wrong orientation, when feeding is stopped and/or blocked, etc.) and provide the part feed data to at least one of computing device 104 and modelling system 110.

In at least one embodiment, the vibratory feeder 120 includes one or more cameras to collect video data (e.g. data relating to a live video stream of at least a portion of the vibratory feeder 120, data relating the cause of feeder blockage or stoppage with the condition of the vibratory feeder 120) and provide the video data to at least one of computing device 104 and modelling system 110.

Figure 3:
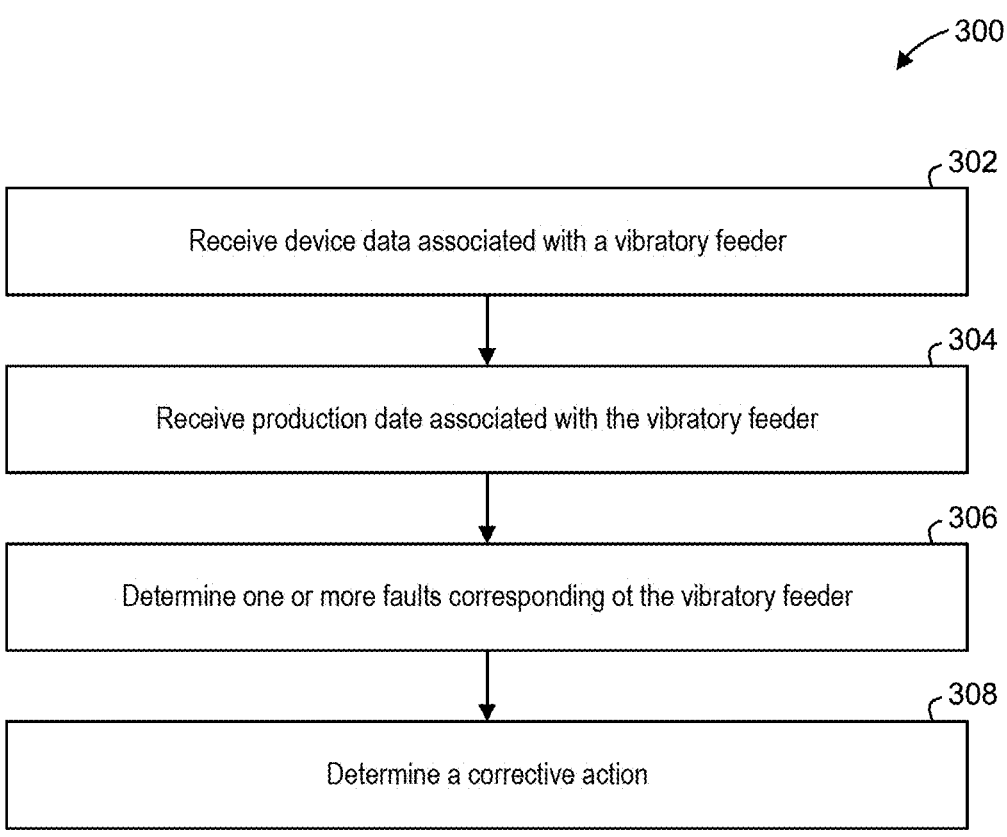
FIG. 3 is a flowchart of an example method of operating the modeling system of FIG. 1 to monitor a vibratory feeder, according to at least one embodiment.

Reference is now made to FIG. 3, which shows a flowchart of an example method 300 of operating the modeling system 110. The method 300 can be implemented by the modeling system 110 to, for example, monitor a production level of the vibratory feeder 120, or, for example, to optimize the operation of the vibratory feeder 120.

At 302, the processor 112 can receive device data associated with the vibratory feeder 120 during operation of the vibratory feeder 120. Typically, the device data includes at least one input state of the vibratory feeder. The processor 112 can receive the data from various sources and in various formats. For example, the processor 112 may receive the data from the data storage 114, the external data storage 108, the computing device 104, and/or the vibratory feeder 120. The processor 112 can receive various data associated with the vibratory feeder 120, including but not limited to the productivity of the vibratory feeder 120.

The data received by the processor 112 may include subsets of data that correspond to each other. Some of the received data may be associated with the same (or approximately the same) point in time. For example, for the vibratory feeder 120, the received data may include the input state of vibratory feeder 120 at a particular time and a production level at the same time.

At 304, the processor 112 can receive production data associated with the vibratory feeder 120, the production data being representative of a production level of the vibratory feeder 120.

In at least one embodiment, the production data includes one or more of: parameter settings, monitoring variables and run rates.

At 306, the processor 112 can determine, based on the received data and/or the production data, one or more faults corresponding to the vibratory feeder 120 when the production level falls below a threshold production level. For example, each fault can correspond to a component of the vibratory feeder 120. A fault may indicate the occurrence of one or more errors, defects, or other failures at the corresponding component of the vibratory feeder 120. For example, a fault of the chute 206 may include the workpieces being trapped on a curve of the chute and backing up along the chute.

The processor 112 may determine the faults based on the received data and/or the production data. For example, the processor 112 may identify a fault with the chute 206 when the vibratory feeder 120 has an input state of running normally. In some embodiments, the processor 112 may determine the faults based on the production level or fault level of the vibratory feeder 120. For example, continuing with the example of the manufacturing assembly line 120A, the processor 112 may determine that a particular component of the vibratory feeder 120 is faulted when the production level for the vibratory feeder 120 is below a predetermined level or when the defect level for the vibratory feeder 120 is above a predetermined level.

The processor 112 may determine the faults based on the received data. In some embodiments, the processor 112 may determine the faults based on predictions made by a predictive model. For example, the input states, production levels, and/or defect levels may be determined by the processor 112 from the received data or from predictions generated from a trained model using the received data.

The predictive model may be stored in the system 110 (e.g. in data storage 114) and may be based on more or more of the following: historical feeder performance data; historical feeder settings controls; historical video feeds of the vibratory feeder; machine learning training; historical insights and alerts and parameter history. The predictive model may be based on the historical production levels of a single vibratory feeder 120 or may be based on the historical production levels of many vibratory feeders 120.

For example, the processor 112 may use a predictive model to predict a production level of the vibratory feeder 120 when one or more faults are occurring and/or one or more predictive properties of the vibratory feeder 120.

The faults determined by the processor 112 may all be for the same vibratory feeder 120. In some embodiments, the faults determined by the processor 112 may be for a number of different vibratory feeders 120.

In at least one embodiment, if a vibratory feeder 120 has multiple outlet lanes, the processor 112 may also use the predicted properties to balance out the vibratory feeder 120 throughput for each lane.

In at least one embodiment, the processor 112 may also use the predicted properties to determine whether the vibratory feeder 120 will meet a production quota and determine the priority level based on whether the production quota will be met. For example, the processor 112 may determine a production level or defect level of the vibratory feeder 120 and determine based on the production level or defect level whether the production quota will be met. If the predicted production of the vibratory feeder 120 does not meet the production quota, the processor 112 may assign a relatively high priority level to these faults.

In at least one embodiment, the processor 112 may also use the predicted properties to determine a cost for reworking or scrapping the defective products and determine the priority level based on the cost. For example, the processor 112 may determine the number of defective products produced based on a predicted defect rate and determine the cost for reworking or scrapping the defective products. If the rework or scrap cost is relatively high, the processor 112 may assign a relatively high priority level to these faults.

In at least one embodiment, the priority level for a fault or set of faults can be determined based on the predicted input state of another cell when the fault or set faults is occurring.

At 308, the processor 112 can determine, based on the one or more faults, a corrective action based on the device data and the production level of the vibratory feeder 120 to return the production level to or above the threshold production level.

In at least one embodiment, determining the corrective action includes comparing the device data to one or more of: historical feeder performance data; historical feeder settings controls, historical video feeds of the vibratory feeder; machine learning training; historical insights and alerts and parameter history.

In at least one embodiment corrective action is one of: adjusting a power and/or a frequency of a vibratory drive of the vibratory feeder; activating a bowl blow-off control; activating a hopper start/start control; issuing a replenish parts warning; and indicating a part jam fault. It should be understood that other corrective actions known to those skilled in the art may also be determined by the processor 112.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A method of monitoring a production level of a vibratory bowl feeder configured to process a workpiece, the method comprising operating a processor to:

receive device data associated with the vibratory bowl feeder during operation of the vibratory bowl feeder, the device data including vibration data, temperature data, humidity data, bowl fill level data, start/stop control data, override control data, and/or part feed data;

receive production data associated with the vibratory feeder, the production data indicating a production level of the vibratory feeder;

determine, based on the device data and/or the production data, one or more faults corresponding to the vibratory feeder;

identify, by the processor using a prediction made by an automatically trained machine leaning model, the one or more faults, the prediction model being based on data received by a modelling system, the data received by the modelling system including: the device data, historical feeder performance data, historical feeder settings controls, historical video feeds of the vibratory bowl feeder, machine learning training, historical alerts, and/or parameter history, the one or more faults being a sensor fault or an operational fault;

determine, using the production model, a predicted production level of the vibratory feeder;

initiate control, based on the identified one or more faults, of a corrective action of the vibratory feeder to return the production level to a threshold production level, the corrective action being one of:

adjusting a power and/or a frequency of a vibratory drive of the vibratory feeder;

activating a bowl blow off control;

activating a hopper start/stop control;

issuing a replenish parts warning; and indicating a part fault jam; and implementing the corrective action on the vibratory bowl feeder when the predicted production level falls below a threshold production level to return the vibratory bowl feeder to the threshold production level.

2. The method of claim 1, wherein the device data includes at least one input state of the bowl feeder, the input state indicating that the vibratory feeder is overfed, underfed or starved.

3. The method of claim 1, wherein the production data includes one or more of: parameter settings, monitoring variables and run rates.

4. A system for monitoring a production level of a vibratory feeder configured to process a workpiece, the system comprising:

the vibratory bowl feeder; and a processor configured to:

receive device data associated with the vibratory bowl feeder during operation of the vibratory bowl feeder, the device data including at least one of: vibration data, temperature data, humidity data, bowl fill level data, start/stop control data, override control data, and/or part feed data;

receive production data associated with the vibratory bowl feeder, the production data indicating a production level of the vibratory bowl feeder;

determine, based on the device data and the production data, one or more faults corresponding to the vibratory bowl feeder;

configured to identify, using a prediction made by an automatically trained machine learning model, the one or more faults, the prediction model being based on data received by a modelling system, the data received by the modelling system including the device data; historical feeder performance data; historical feeder settings controls; historical video feeds of the vibratory bowl feeder; machine learning training; historical alerts; and/or parameter history, the one or more faults being a sensor fault or an operational fault;

initiate control, based on the identified one or more faults, of a corrective action to return the production level to or above the threshold production level, the corrective action being one of:

adjusting a power and/or a frequency of a vibratory drive of the vibratory feeder;

activating a bowl blow off control;

activating a hopper start/stop control;

issuing a replenish parts warning; and indicating a part fault jam; and implementing the corrective action on the vibratory bowl feeder when the predicted production level falls below a threshold production level to return the vibratory bowl feeder to the threshold production level.

5. The system of claim 4, wherein the device data includes at least one input state of the bowl feeder, the input state indicating that the vibratory feeder is overfed, underfed or starved.

6. The system of claim 4, wherein the production data includes one or more of: parameter settings, monitoring variables and run rates.

7. The system of claim 4, wherein determining the corrective action includes comparing the device data to one or more of: historical feeder performance data; historical feeder settings controls, historical video feeds of the vibratory feeder; machine learning training; historical insights and alerts and parameter history.

\* \* \* \* \*